US006640950B2

(12) United States Patent
Harvey et al.

(10) Patent No.: US 6,640,950 B2
(45) Date of Patent: Nov. 4, 2003

(54) FLUID CLUTCH FILL DETECTION SYSTEM AND METHOD

(75) Inventors: Keith F. Harvey, Peoria, IL (US); Javad Hosseini, Edelstein, IL (US); Ken Liesener, Peoria, IL (US); Brad McCunn, Eureka, IL (US); Gregory Menke, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 10/029,815

(22) Filed: Dec. 28, 2001

(65) Prior Publication Data

US 2003/0121748 A1 Jul. 3, 2003

(51) Int. Cl.$^7$ ................................................ F16D 48/06
(52) U.S. Cl. ................................ 192/85 R; 192/109 F; 192/87.11
(58) Field of Search ........................... 192/85 R, 30 W, 192/109 F, 87.11, 87.13, 3.58; 701/66, 67, 64

(56) References Cited

U.S. PATENT DOCUMENTS

| | | | |
|---|---|---|---|
| 3,789,946 A | | 2/1974 | Jorgensen et al. |
| 3,991,633 A | | 11/1976 | Molnar et al. |
| 3,995,426 A | | 12/1976 | Habiger |
| 4,286,684 A | | 9/1981 | Berg |
| 4,387,589 A | | 6/1983 | Larson |
| 4,531,494 A | | 7/1985 | Bailey et al. |
| 4,865,176 A | | 9/1989 | Blake et al. |
| 4,942,787 A | * | 7/1990 | Aoki et al. ................. 477/152 |
| 5,035,312 A | * | 7/1991 | Asayama et al. .......... 192/85 R |
| 5,054,599 A | * | 10/1991 | Marcott ..................... 192/85 R |
| 5,168,973 A | * | 12/1992 | Asayama et al. .......... 192/85 R |
| 5,305,657 A | | 4/1994 | Bray et al. |
| 5,337,871 A | * | 8/1994 | Testerman ................. 192/85 R |
| 5,343,994 A | * | 9/1994 | Kyrtsos .................... 192/85 R |
| 5,446,980 A | | 9/1995 | Rocke |
| 5,493,798 A | | 2/1996 | Rocke et al. |
| 5,582,007 A | | 12/1996 | Coutant et al. |
| 5,624,339 A | | 4/1997 | Coutant et al. |
| 5,630,673 A | | 5/1997 | Krzywanos et al. |
| 5,706,657 A | | 1/1998 | Amborski et al. |
| 5,733,095 A | | 3/1998 | Palmer et al. |
| 5,737,979 A | | 4/1998 | McKenzie et al. |
| 5,806,370 A | | 9/1998 | Carlson et al. |
| 5,842,144 A | | 11/1998 | Coutant et al. |
| 5,848,952 A | | 12/1998 | Hayward |
| 5,853,076 A | * | 12/1998 | McKee et al. ............ 192/87.14 |
| 5,934,431 A | | 8/1999 | Bladow |
| 5,941,358 A | * | 8/1999 | Hosseini et al. ........... 192/85 R |
| 5,950,789 A | * | 9/1999 | Hosseini et al. ........... 192/85 R |
| 6,088,645 A | * | 7/2000 | Kawasaki et al. ............. 701/67 |
| 6,115,661 A | * | 9/2000 | Hosseini et al. .............. 701/51 |
| 6,341,552 B1 | * | 1/2002 | Potter et al. ................... 91/433 |
| 6,499,577 B2 | * | 12/2002 | Kitamoto et al. .......... 192/85 R |

OTHER PUBLICATIONS

Brezonick, Mike, Powertrain, "ZF Unveils Newest WG Transmissions", North American Edition, Diesel Progress, Aug. 1997, pp. 40, 42.

"Transmissions for Construction Machinery", Off–Highway Engineering, Jun. 1997, pp. 47–49.

* cited by examiner

Primary Examiner—Rodney H. Bonck
Assistant Examiner—Eric M. Williams
(74) Attorney, Agent, or Firm—Finnegan, Henderson, Farabow, Garrett & Dunner, L.L.P.; Steven M. Hanley

(57) ABSTRACT

A method of controlling a transmission is provided. A command is received to engage a clutch having a chamber. A control valve is opened to allow pressurized fluid to flow from a fluid supply line into the clutch chamber. The pressure of the fluid within the fluid supply line is monitored as fluid flows through the control valve to enter the clutch chamber. A rate of change in the volume of fluid entering the chamber is determined based on the sensed pressure of the fluid within the fluid supply line. A fill point of the clutch chamber is detected when the rate of change in the volume of fluid entering the chamber is less than a volume differential threshold.

21 Claims, 5 Drawing Sheets

FLUID CLUTCH FILL DETECTION SYSTEM AND METHOD

TECHNICAL FIELD

The present invention is directed to a system and method for detecting the fill point of a fluid clutch. More particularly, the present invention is directed to a system and method for detecting the fill point of a fluid clutch based on the pressure of a fluid supply line.

BACKGROUND

Most vehicles include a transmission that translates the rotational speed of an engine shaft into a drive speed for the vehicle. A transmission typically includes a series of gears that may be selectively engaged to provide a series of gear ratios that translate the speed of the engine shaft into different drive speeds. The gear ratios usually include forward and reverse gears that range from low to high to provide different powers and speeds for the vehicle as different operating conditions are encountered. A desired gear ratio may be obtained by engaging one or more clutches within the transmission. The engagement of a clutch may connect a pair of gears to thereby transmit the torque of the engine shaft. The difference between the rotational speed of the engine shaft and the drive speed depends upon the gear ratio of the connected gears.

A transmission may utilize many types of clutches such as, for example, fluid clutches or mechanical clutches to engage a particular gear ratio. Each type of clutch may connect a moving part to a non-moving part through a frictional engagement. A force may need to be applied to one of the moving or the non-moving parts to effect the frictional engagement. In a mechanical clutch, this force may be generated by a spring. In a fluid clutch, this force may be generated by fluid pressure.

When, for example, a force is applied to a non-moving part to engage a clutch, the non-moving part will gradually engage the moving part as the force of the clutch is increased. If the force is applied too rapidly, the vehicle will jump or jerk when the clutch engages. If the force is not great enough to completely engage the parts, the clutch may slip, causing the vehicle to shake.

In a fluid clutch, a pressurized fluid may be introduced into a chamber to create the engagement force. A control valve typically governs the flow of fluid into the clutch. To engage the clutch, the control valve is opened to allow a restricted flow of fluid to enter and fill the clutch chamber. Once the chamber is filled with fluid, the valve is gradually modulated to a maximum open position to gradually increase the pressure of the fluid and the engagement force of the clutch. If the valve is modulated open too quickly, or modulated open prior to the clutch chamber filling with fluid, the clutch engagement may occur too quickly and cause the vehicle to jump or jerk.

A transmission will typically include a system or method for determining the time required to fill the clutch chamber. As described in U.S. Pat. No. 5,737,979, the fill time for a particular clutch may be determined by a calibration process. In the calibration process, the fill time for a particular clutch is carefully measured under a variety of operating conditions, such as, for example, different engine speeds and fluid temperatures. The fill times are stored as "look up tables" in the memory of a control unit. During standard operation, the control unit accesses these "look up tables" to determine the appropriate fill time for a clutch based on the current operating conditions. After the allotted fill time has expired, the control will gradually modulate the valve to the fully open position to increase the pressure of the fluid in the clutch chamber and complete the clutch engagement.

The calibration process required to determine the clutch fill time on a transmission may be expensive and inconvenient. Typically, a skilled technician and special equipment are required to perform the calibration. However, this may require that a transmission be sent to an off-site maintenance facility.

The fluid clutch fill detection system and method of the present invention solves one or more of the problems set forth above.

SUMMARY OF THE INVENTION

One aspect of the present invention is directed to a method of controlling a transmission. A command is received to engage a clutch having a chamber. A control valve is opened to allow pressurized fluid to flow from a fluid supply line into the clutch chamber. The pressure of the fluid within the fluid supply line is monitored as fluid flows through the control valve to enter the clutch chamber. A rate of change in the volume of fluid entering the clutch chamber is determined based on the sensed pressure of the fluid within the fluid supply line. A fill point of the clutch chamber is detected when the rate of change in the volume of fluid entering the clutch chamber is less than a volume differential threshold.

In another aspect, the present invention is directed to a control system for a transmission. The transmission includes a source of pressurized fluid, at least one clutch having a chamber, at least one control valve, and a fluid supply line connecting the source of pressurized fluid with the at least one control valve. The control system includes a pressure sensor disposed in the fluid supply line between the source of pressurized fluid and the at least one control valve to sense the pressure of the fluid in the fluid supply line. A control is configured to selectively open the at least one control valve to allow pressurized fluid to enter the chamber of the at least one clutch, to monitor the pressure of the fluid in the fluid supply line, and to determine when the chamber of the at least one clutch is filled with fluid based on the monitored pressure of the fluid in the fluid supply line.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
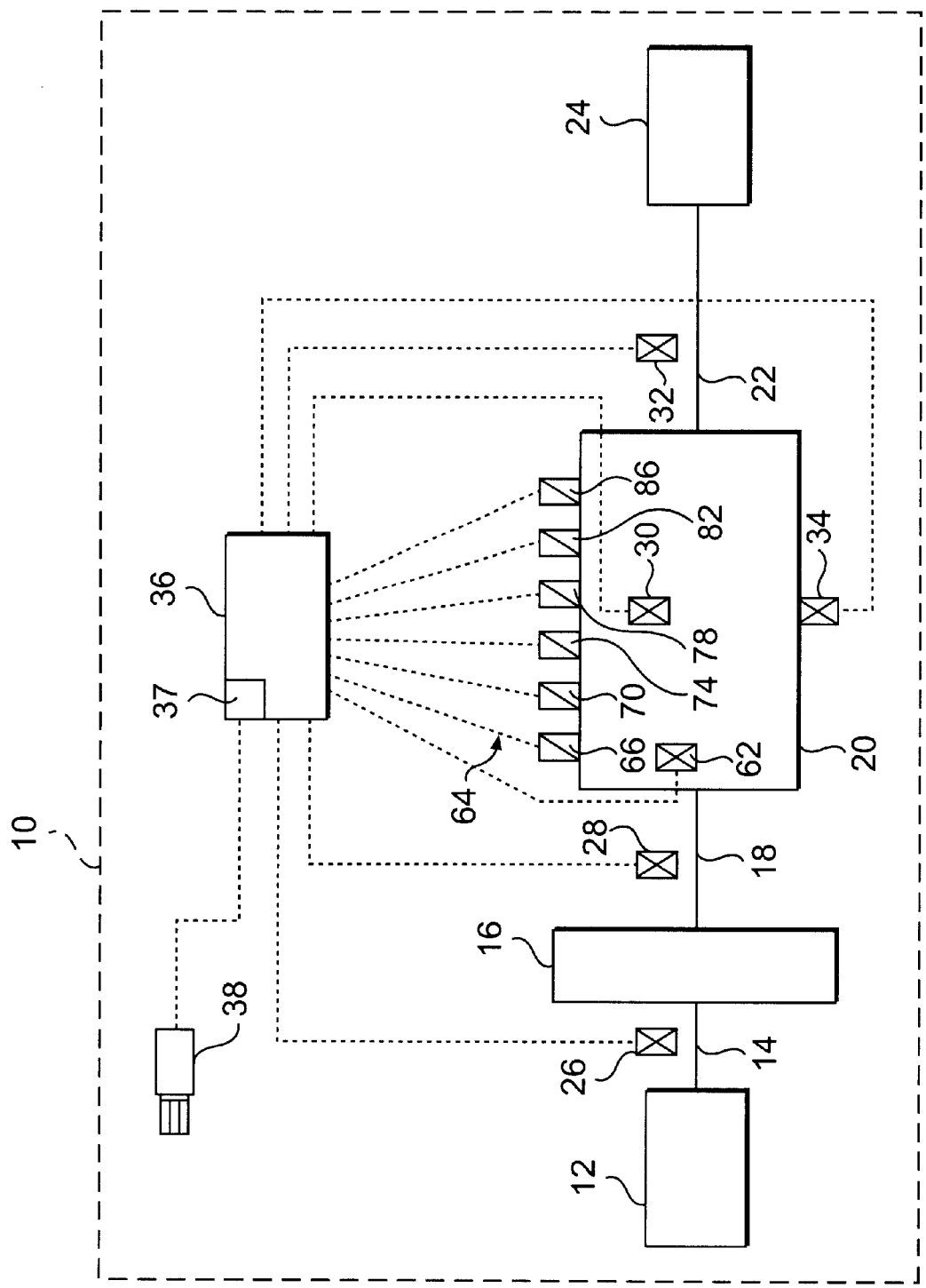
FIG. 1 is a diagrammatic illustration of an exemplary embodiment of a work machine having an electronically controlled hydraulic transmission in accordance with the present invention.

As diagrammatically illustrated in FIG. 1, a vehicle 10 may include an engine 12 that exerts a rotational torque on an engine shaft 14. Engine shaft 14 is connected to a torque converter 16 and to transmission 20 through a transmission input shaft 18. Torque converter 16 may convert the rotational speed of engine shaft 14 into a corresponding rotation of a transmission input shaft 18. Transmission 20 may convert the rotational speed of transmission input shaft 18 into a corresponding rotation of a transmission output shaft 22. Transmission output shaft 22 is connected to power train 24, which propels vehicle 10. Thus, the rotational speed and torque generated by engine 12 as translated by torque converter 16 and transmission 20 may be used to propel vehicle 10.

Figure 2:
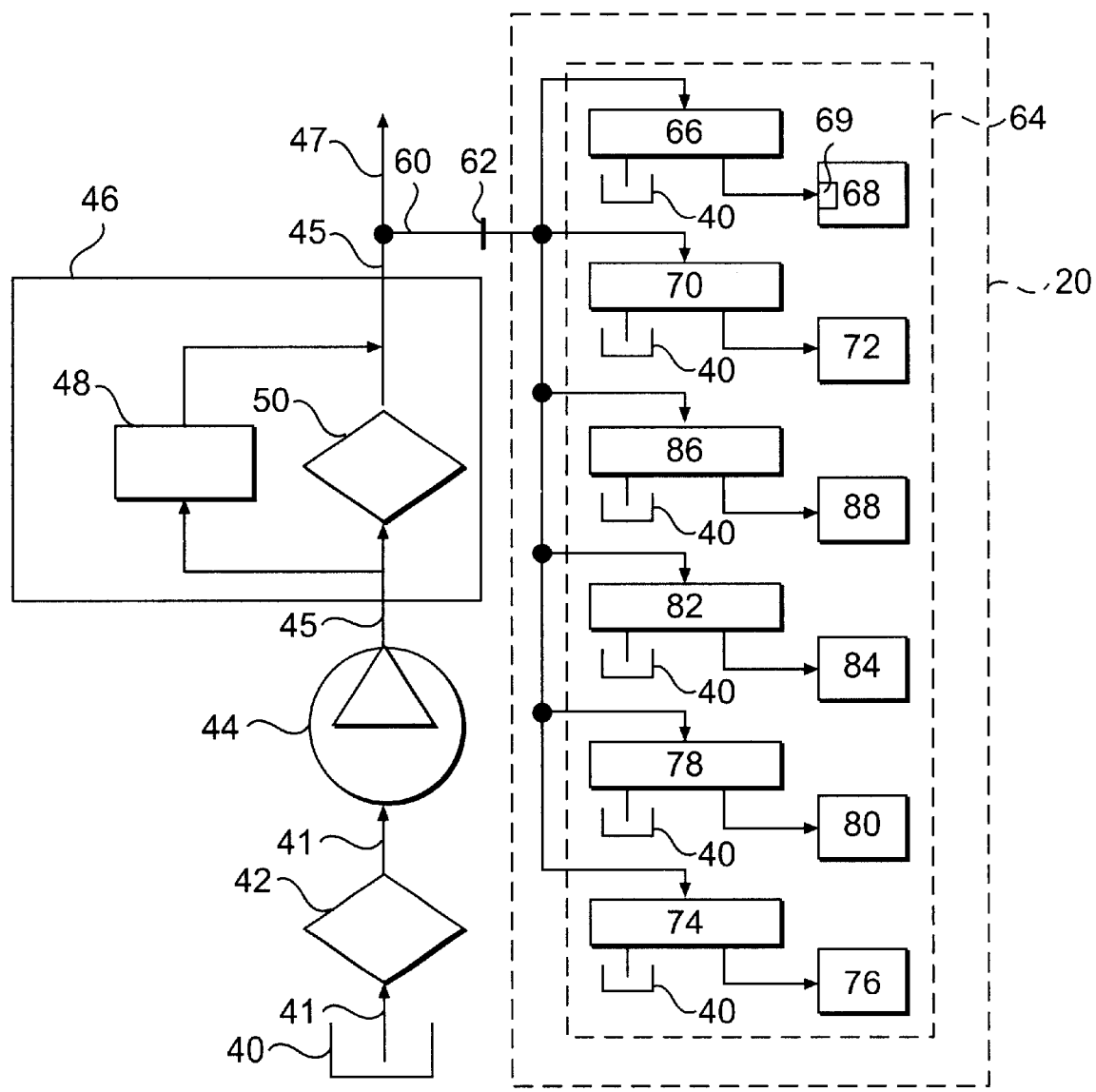
FIG. 2 is a diagrammatic illustration of an exemplary embodiment of a hydraulic transmission in accordance with the present invention.

An exemplary embodiment of transmission 20 is diagrammatically illustrated in FIG. 2. Transmission 20 may include a series of clutches and associated control valves 64. For example, transmission 20 may include a reverse clutch 68, a forward clutch 72, a first clutch 76, a second clutch 80, a third clutch 84, and a fourth clutch 88. Each of clutches 68, 72, 76, 80, 84, and 88 may be a fluid operated clutch, where the engagement of the clutch is controlled by the introduction of pressurized fluid into the clutch. For example, the engagement of reverse clutch 68 may be controlled by directing pressurized fluid into a fluid chamber 69.

As also illustrated in FIG. 2, a source of pressurized fluid 44, which may be, for example, a fixed or variable capacity pump, is provided to supply pressurized fluid to the series of clutches and valves 64 within transmission 20. Source of pressurized fluid 44 draws fluid from a tank 40 through a fluid line 41. A filter 42 may disposed in fluid line 41 to remove any foreign objects from the fluid. Source of pressurized fluid 44 works the fluid to a predetermined pressure and directs the pressurized fluid into a fluid line 45.

A filter system 46 may be disposed in fluid line 45 to further cleanse the pressurized fluid. Filter system 46 may include a second filter 50 and a bypass valve 48. Bypass valve 48 may be configured to open and allow the pressurized fluid to bypass the second filter 50 if the pressure drop over second filter 50 exceeds a predetermined limit.

The flow of fluid in fluid line 45 may be split between a fluid line 47 and a fluid supply line 60. Fluid line 47 may direct pressurized fluid to other systems within vehicle 10 that may require pressurized fluid. For example, fluid line 47 may lead to torque converter 16 or may lead to a lubrication system to lubricate another system, such as transmission 20.

Fluid supply line 60 directs pressurized fluid into transmission 20 and to a series of fluid supply lines for each clutch 68, 72, 76, 80, 84, and 88, respectively. A series of control valves 66, 70, 74, 78, 82, and 86 may be disposed between fluid supply line 60 and each of clutches 68, 72, 76, 80, 84, and 88. Control valves 66, 70, 74, 78, 82, and 86 may be any type f device configured to control the direction and rate of a flow of pressurized fluid. For example, control valves 66, 70, 74, 78, 82, and 86 may be solenoid operated valves that may be modulated to allow a predetermined amount of fluid flow therethrough. A pressure sensor 62 may be disposed in fluid supply line 60 to sense the pressure of the fluid within fluid supply line 60. Pressure sensor 62 may be disposed in any alternative location that permits the sensing of the pressure of the fluid within fluid supply line 60.

Each of control valves 66, 70, 74, 78, 82, and 86 may be configured to control the rate and direction of fluid flow into one of clutches 68, 72, 76, 80, 84, and 88. For example, control valve 66 may control the rate and direction of fluid flow into and out of reverse clutch 68, control valve 70 may control the rate and direction of fluid flow into and out of forward clutch 72, control valve 74 may control the rate and direction of fluid flow into and out of first clutch 76, control valve 78 may control the rate and direction of fluid flow into and out of second clutch 80, control valve 82 may control the rate and direction of fluid flow into and out of third clutch 84, and control valve 86 may control the rate and direction of fluid flow into and out of fourth clutch 88. Each of control valves 66, 70, 74, 78, 82, and 86 may direct fluid exiting clutches 68, 72, 76, 80, 84, and 88 to tank 40.

By selectively opening and closing each control valve 66, 70, 74, 78, 82, and 86, each of clutches 68, 72, 76, 80, 84, and 88 may be selectively engaged to obtain a desired gear ratio for vehicle 10. The particular gear ratio to be engaged at a particular time may be based on the power requirements of vehicle 10 and transmitted to transmission 20 through an input shift mechanism 38 and a control 36 (referring to FIG. 1). For example, if an operator has instructed vehicle 10 to begin moving from a stopped position, input shift mechanism 38 may transmit a signal to control 36 to engage forward clutch 72 and first clutch 76 to obtain a low gear ratio. If operator has instructed vehicle 10 to accelerate from a low speed to a high speed, input shift mechanism may transmit a signal to control 36 to disengage first clutch 76 and engage second clutch 80 to obtain a higher gear ratio.

As shown in FIG. 1, control 36 is connected to each of control valves 66, 70, 74, 78, 82, and 86 and may control each of the valves to regulate the amount of pressurized fluid flowing to the respective clutch. Control 36 may include a computer, which has all the components required to run an application, such as, for example, a memory 37, a secondary storage device, a processor, such as a central processing unit, and an input device. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

As also shown in FIG. 1, control 36 may also be connected to a series of sensors disposed on vehicle 10 to provide information regarding the operating conditions of vehicle 10. For example, control 36 may be connected to pressure sensor 62 to receive information regarding the pressure of the fluid within fluid supply line 60. In addition, control 36 may be connected to a first sensor 26, a second sensor 28, a third sensor 30, a fourth sensor 32, and a fifth sensor 34. First sensor may be disposed adjacent engine shaft 14 to provide information regarding the rotational speed of engine shaft 14. Second sensor 28 may be disposed adjacent transmission input shaft 18 to provide information regarding the rotational speed of transmission input shaft 18. Third sensor 30 may be disposed within transmission 20 to provide information regarding the operation of transmission 20. Fourth sensor 32 may be disposed adjacent transmission output shaft 22 to provide information regarding the rotational speed of transmission output shaft 22. Fifth sensor 34 may be disposed adjacent a portion of transmission 20 to provide information, such as, for example, the temperature, about the hydraulic fluid within transmission 20. These sensors may be any type of device commonly used to provide such information, including, for example, conventional electrical transducers such as potentiometer, thermistors and/or magnetic speed pickups or any other device readily apparent to one skilled in the art.

When control 36 receives a signal from input shift mechanism 38 to engage a certain gear ratio, control 36 sends an engagement signal to the particular control valves 66, 70, 74, 78, 82, and 86, whose associated clutches may be engaged to effect the desired gear ratio. The engagement signal may be, for example, a variable current that modulates the particular control valve to allow a pre-determined amount of fluid to flow to the associated clutch. Alternatively, the engagement signal may be any other type of command that may be issued to a control valve to cause the control valve to open a predetermined amount.

Figure 3A:
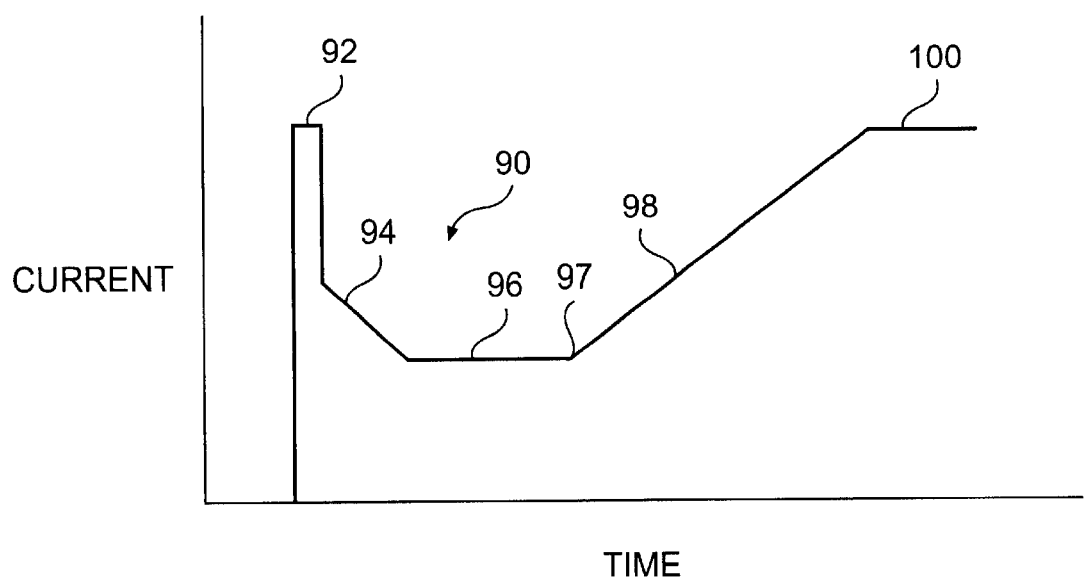
FIG. 3a is a graphic illustration of an exemplary clutch command signal.

As shown in the exemplary embodiment of FIG. 3a, the engagement signal is a clutch command 90. Clutch command 90 may be an electrical current that varies over a period of time. Clutch command 90 may include an initial pulse period 92 that opens the particular control valve to its fully opened position to start a flow of fluid into the empty chamber of the associated clutch. After a period of time, the current of clutch command 90 may be reduced in a flow decrease period 94 to decrease the amount of fluid flowing into the clutch chamber. The current of clutch command 90 may then be substantially stabilized for a fill period 96. In fill period 96, fluid is allowed to enter the clutch chamber until the chamber is filled with fluid. Once the chamber is filled with fluid, clutch command 90 enters a valve modulation period 98 where the control valve is gradually modulated to a maximum open period 100 to fully open the control valve and gain maximum exposure of the clutch chamber to the pressurized fluid in fluid supply line 60. This causes the pressure of the fluid in the clutch chamber to gradually increase to thereby allow the clutch to gradually engage. If the current sent to the control valve during valve modulation period 98 results in a rapid increase in the flow of fluid to the clutch chamber, the resulting engagement of the clutch may cause the vehicle to jerk or jump.

Accurately determining a fill point 97, where the clutch chamber is filled with fluid, will allow control 36 to start valve modulation period 98 of clutch command 90 as soon as possible. Without an accurate determination of fill point 97, control 36 may need to wait a predetermined period of time before ramping up the current in valve modulation period 98. This may result in a delay in the desired gear engagement taking place.

Figure 4:
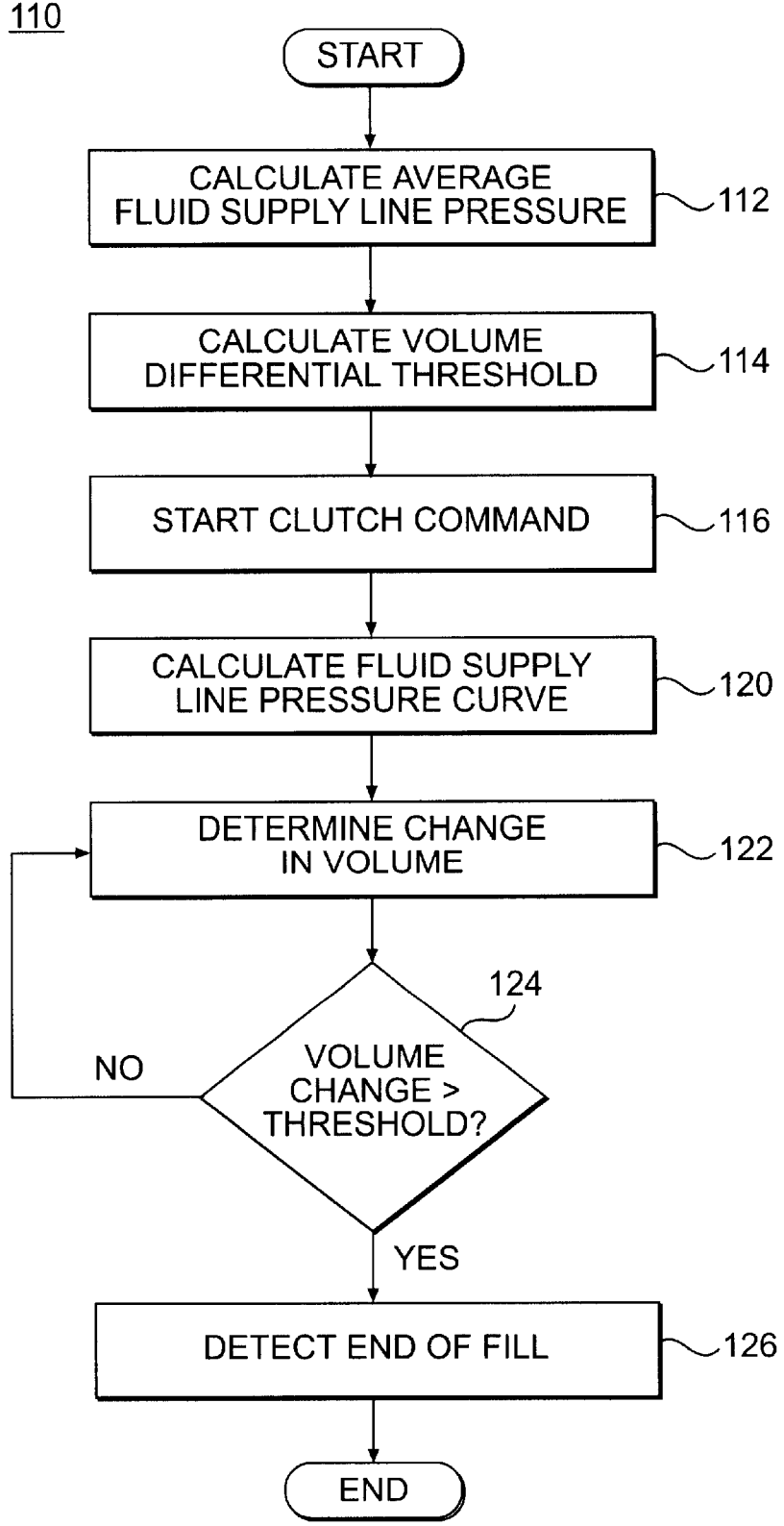
FIG. 4 is a flowchart illustrating an exemplary method of detecting the fill point of a fluid clutch in accordance with the present invention.

An exemplary method 110 of identifying the fill point 97 of a clutch chamber based on the fluid pressure in the fluid supply line 60 is illustrated in the flowchart of FIG. 4. An average pressure ($P_a$) of the fluid within fluid supply line 60 is determined. (Step 112) Average pressure ($P_a$) may be determined by averaging several pressure readings of fluid supply line 60 over a period of time in which no clutch is being engaged. Accordingly, average pressure ($P_a$) will provide an indication of the average pressure of fluid supply line 60 as provided by source of pressurized fluid 44.

Control 36 may also determine a volume differential threshold ($V_t$). (Step 114). Volume differential threshold ($V_t$) may be constant number that represents any leakage from either the clutch or the valve. Alternatively, volume differential threshold ($V_t$) may be calculated based on a measure of the pressure conditions of fluid supply line 60 when no clutch is being engaged. As described in greater detail below, control 36 may use volume differential threshold ($V_t$) for comparison purposes during the engagement of a clutch.

Volume differential threshold ($V_t$) may be calculated by determining the area under a curve that compares the difference in a series of actual pressure readings ($P_t$) of the fluid pressure in fluid supply line 60 to the average pressure ($P_a$) in fluid supply line 60. This curve may be plotted, for example, by making ten pressure readings ($P_t$) of the pressure in fluid supply line 60 over the course of a time period, such as, for example, one second, when no clutch is being engaged. The difference between the pressure readings ($P_t$) and the average pressure ($P_a$), i.e. $P_t-P_a$, are plotted as a function of time. The area under the plotted curve ($V_a$) provides an indication of the magnitude and frequency of volume fluctuation in fluid supply line 60 when no clutch is being engaged. Volume differential threshold ($V_t$) may be determined by multiplying the area under the curve ($V_a$) by a scaling factor, such as 0.1 in the current example. The resulting volume differential threshold ($V_t$) may be used as a basis of comparison to determine fill point 97 for the clutch chamber.

Upon receipt of a signal from input shift mechanism 38 to engage a certain combination of gears, control 36 will start transmitting a clutch command 90 (referring to FIG. 3a) to one of control valves 66, 70, 74, 78, 82, and 86. (Step 116). Control 36 will monitor the pressure ($P_t$) of the fluid in fluid supply line 60 as clutch command 90 is sent to the appropriate control valve. Control 36 may monitor and store the sensed pressure ($P_t$) of the fluid in fluid supply line 60 on a continuous or periodic basis.

Figure 3B:
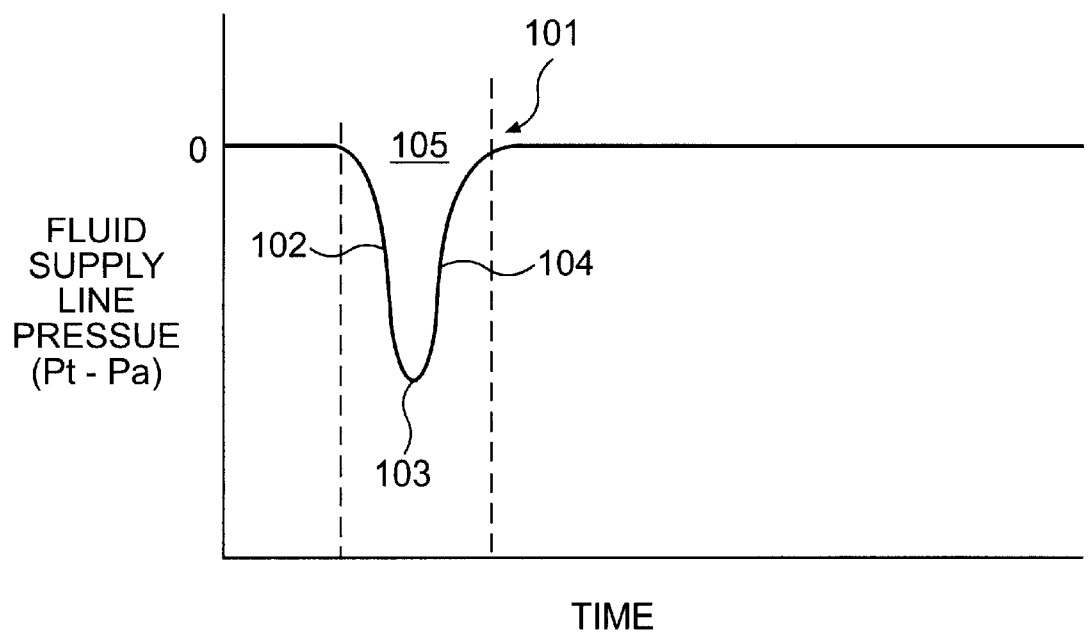
FIG. 3b is a graphic illustration of a fluid supply line pressure curve depicting the change in the fluid pressure within a fluid supply line as a fluid clutch is engaged.

Control 36 may calculate a supply line pressure curve 101 (referring to FIG. 3b) based on the pressure readings ($P_t$) obtained as clutch command 90 is executed by the control valve. (Step 120) An exemplary supply line pressure curve 101 is illustrated in FIG. 3b. Supply line pressure curve 101 may be calculated by subtracting the average pressure ($P_a$) of the fluid in fluid supply line 60 from the sensed pressure ($P_t$) of the fluid in fluid supply line 60, i.e., $P_t-P_a$. The resulting pressure may be plotted as a function of time. As shown in FIG. 3b, supply line pressure curve 101 will likely show a pressure drop 102 in fluid supply line 60 that occurs as the control valve opens and fluid begins to flow from fluid supply line 60 into the empty clutch chamber. Supply line pressure curve will likely reach a maximum magnitude 103 before showing a pressure rise 104 that occurs as the clutch chamber becomes filled with fluid.

Control 36 may determine the change in volume in fluid supply line 60 based on the supply line pressure curve 101. (Step 122). The volume of fluid that has entered the clutch chamber may be determined by calculating the area 105 (referring to FIG. 3b) under the supply line pressure curve 101. The calculated volume may then be plotted as a function of time. The slope of this plot may represent the rate of fluid transfer from fluid supply line 60.

Figure 3C:
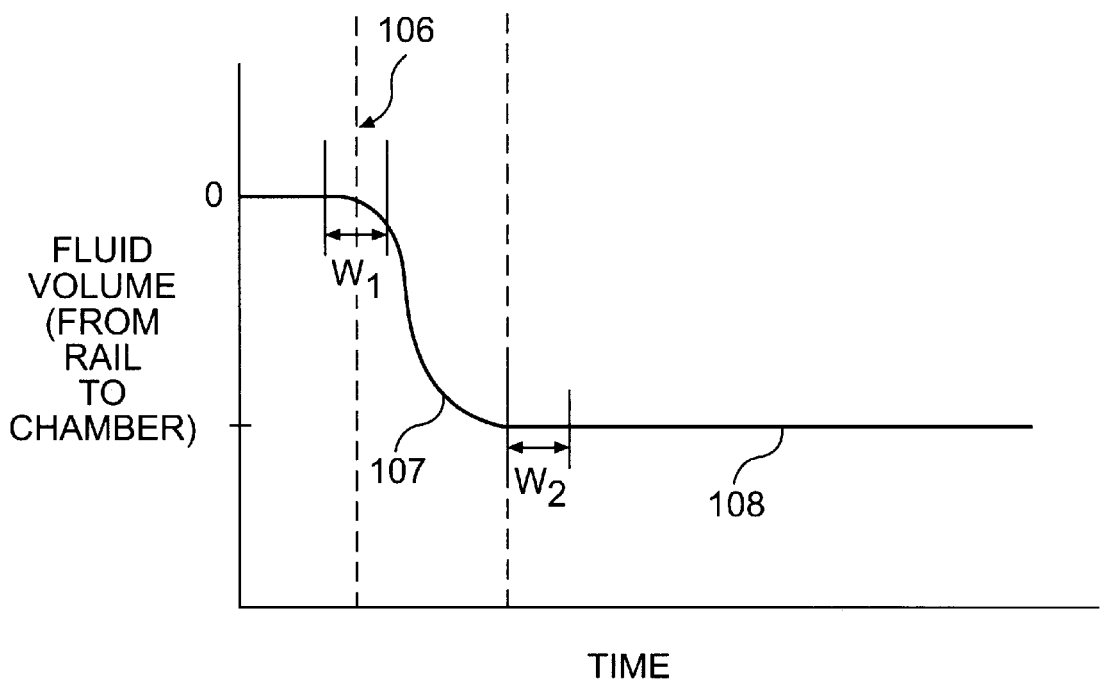
FIG. 3c is a graphic illustration of a volume plot of a fluid supply line depicting the volume of fluid leaving the fluid supply line as a fluid clutch is engaged.

An example of a volume plot 106 is illustrated in FIG. 3c. Volume plot 106 will likely include a volume decrease 107 that substantially corresponds to pressure drop 102 of supply line pressure curve 101 when fluid starts entering the clutch chamber and volume plot 106 will essentially stabilize when the chamber becomes filled with fluid 108. It should be noted that the exemplary volume plot 106 of FIG. 3c is plotted from the perspective of fluid supply line 60. The change in volume is negative, which indicates that fluid is flowing out of fluid supply line 60. Alternatively, volume plot 106 may be viewed from the perspective of the clutch chamber, so that the volume change will be positive and indicate that fluid is flowing into the clutch chamber.

Control 36 will monitor volume plot 106 to determine when the change in volume is less than volume differential threshold ($V_t$) and, thus, indicate that fill point 97 of the clutch chamber has been reached. (Step 124) To this end, control 36 may assign a moving window (W) to volume plot 106. Moving window (W) includes a certain time span of volume plot 106, such as indicated, for example, by moving window $W_1$ and moving window $W_2$ in FIG. 3c. Control 36 may identify the magnitude of the maximum and minimum volumes within the moving window (W). Control 36 may then calculate the magnitude of the difference between the maximum and minimum values within the moving window. Fill point 97 of the clutch chamber may be identified when the magnitude of the difference between the maximum and minimum values within the moving window is less than the magnitude of volume differential threshold ($V_t$). (Step 126). This calculation essentially determines when the rate of fluid transfer from fluid supply line 60 to the clutch chamber has slowed to substantially steady-state conditions. Thus, control 36 may determine the fill point 97 of a clutch on a real time basis, instead of relying upon calibration parameters stored in memory.

Alternatively, control 36 may monitor the slope of volume plot 106 to identify fill point 97. Control 36 may identify fill point 97 when the slope of volume plot 106 decreases below a predetermined threshold. The decrease in the slope of volume plot 106 to below the predetermined threshold, which may be the volume differential threshold, may indicate that the clutch chamber is filled with fluid.

When control 36 detects the fill point 97, control 36 may proceed with the next portion of clutch command 90, i.e. valve modulation period 98 to increase the fluid pressure within the clutch chamber and engage the clutch. If control 36 does not detect the end of fill point, control 36 may assume that the clutch chamber has filled after a certain time period has elapsed. This time period may be calculated, for example, by combining the average time required for initial pulse period 92, flow decrease period 94, fill period 96 and valve modulation period 98. If this time period elapses without control 36 detecting fill point 97 through the method described above, control 36 may proceed with the next portion of clutch command 90.

Control 36 may also measure the elapsed time for the fill period 96 for a particular clutch from the initiation of clutch command 90 or from the end of initial pulse period 92. Control 36 may store the time of the fill period 96, along with any relevant operating conditions, such as, for example, engine speed and fluid temperature, in memory 37. Control 36 may access the stored times of fill period 96 and operating conditions for use in determining the fill time for future clutch commands 90 under similar operating conditions.

Industrial Applicability

As will be apparent from the foregoing description, the present invention provides a method and system for determining the fill point of a fluid clutch. The fill point of the clutch chamber is identified by monitoring the pressure of the fluid within the fluid supply line to the clutch chamber. By monitoring and plotting the change in the pressure of the fluid within the fluid supply line, the rate of change in the amount of fluid flowing from the fluid supply line may be determined. The fill point may be identified when the rate of change in the amount of fluid flowing from the fluid supply line decreases to substantially steady state conditions. The accurate identification of the fill point will allow the transmission to effectuate a gearing shift in an efficient manner, without premature clutch engagement or clutch slippage.

The present invention is applicable to any vehicle having a transmission that utilizes fluid clutches to effect a particular gear ratio. The present invention may be utilized in a vehicle to allow proper transmission operation without having to follow an expensive and inconvenient calibration process. Thus, the present invention may reduce the amount of time and expense in assembling or repairing a transmission.

It will be apparent to those skilled in the art that various modifications and variations can be made in the clutch fill detection system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of controlling a transmission, comprising:
   receiving a command to engage a clutch having a chamber;
   opening a control valve to allow pressurized fluid to flow from a fluid supply line into the clutch chamber;
   monitoring the pressure of the fluid within the fluid supply line as fluid flows through the control valve to enter the clutch chamber;
   determining a rate of change in the volume of fluid entering the clutch chamber based on the sensed pressure of the fluid within the fluid supply line; and
   detecting a fill point of the clutch chamber when the rate of change in the volume of fluid entering the clutch chamber is less than a volume differential threshold.

2. The method of claim 1, further including measuring the time elapsed between the receipt of the command and the detection of the fill point and storing the elapsed time in a memory.

3. The method of claim 2, further including calculating a supply line pressure curve based on the difference between the monitored pressure of the fluid within the fluid supply line and an average pressure of the fluid within the fluid supply line.

4. The method of claim 3, wherein the volume of fluid entering the clutch chamber is determined by calculating the area under the supply line pressure curve.

5. The method of claim 4, further including plotting the volume of fluid entering the clutch chamber as a function of time.

6. The method of claim 5, further including assigning a moving window to the plot of the volume of fluid entering the clutch chamber as a function of time and determining a maximum value and a minimum value within the moving window.

7. The method of claim 6, wherein the fill point of the clutch chamber is detected when the difference between the maximum value and the minimum value is less than the volume differential threshold.

8. The method of claim 5, wherein the fill point of the clutch chamber is detected when the slope of the plot of the volume of fluid entering the clutch chamber decreases below a predetermined limit.

9. The method of claim 1, wherein the volume differential threshold is calculated by determining the average area under a curve plotted as the difference between the pressure of the fluid in the supply line when the control valve is closed and the average pressure in the fluid supply line as a function of time.

10. A control system for a transmission including a source of pressurized fluid, at least one clutch having a chamber, at least one control valve, and a fluid supply line connecting the source of pressurized fluid with the at least one control valve, comprising:

a pressure sensor disposed in the fluid supply line between the source of pressurized fluid and the at least one control valve to sense the pressure of the fluid in the fluid supply line; and a control configured to selectively open the at least one control valve to allow pressurized fluid to enter the chamber of the at least one clutch, to monitor the pressure of the fluid in the fluid supply line, to determine a rate of change in the volume of fluid entering the clutch chamber based on the pressure of the fluid in the fluid supply line;

and to determine when the chamber of the at least one clutch is filled with fluid based on the rate of change in the volume of fluid entering the clutch chamber.

11. The control system of claim 10, wherein the control is configured to calculated a supply line pressure curve based on the difference between the monitored pressure of the fluid within the fluid supply line and an average pressure of the fluid within the fluid supply line.

12. The control system of claim 11, wherein the control is configured to determine the volume of fluid entering the chamber of the at least one clutch by calculating the area under the supply line pressure curve and to determine the rate of change in the volume of fluid entering the chamber by plotting the volume of fluid entering the chamber of the at least one clutch as a function of time.

13. The control system of claim 12, wherein the control is configured to assign a moving window to the plot of the volume of fluid entering the chamber of the at least one clutch as a function of time and to determine a maximum value and a minimum value within the moving window.

14. The control system of claim 13, wherein the control is configured to determine that the chamber of the at least one clutch is filled when the difference between the maximum value and the minimum value is less than a volume differential threshold.

15. A transmission system, comprising:
at least one clutch having a chamber;
a source of pressurized fluid configured to provide pressurized fluid to the at least one clutch;
at least one control valve configured to control the flow rate of pressurized fluid to the at least one clutch;
a pressure sensor disposed between the source of pressurized fluid and the at least one control valve; and
a control configured to selectively open the at least one control valve to allow pressurized fluid to enter the chamber of the at least one clutch, to monitor the pressure of the fluid between the source of pressurized fluid and the at least one control valve, to determine a rate of change in the volume of fluid entering the clutch chamber based on the pressure of the fluid between the source of pressurized fluid and the at least one control valve, and to determine when the clutch chamber is filled with fluid based on the rate of change in the volume of fluid entering the clutch chamber.

16. The transmission of claim 15, further including a series of clutches and a series of control valves, each of the series of control valves configured to control the rate and direction of fluid flow into one of the series of clutches.

17. The transmission of claim 15, further including a fluid supply line configured to supply pressurized fluid from the source of pressurized fluid to the at least one control valve and wherein the pressure sensor is operatively disposed in the fluid supply line.

18. The transmission of claim 17, wherein the control is configured to calculate a supply line pressure curve based on the difference between the monitored pressure of the fluid within the fluid supply line and an average pressure of the fluid within the fluid supply line.

19. The transmission of claim 18, wherein the control is configured to determine the volume of fluid entering the chamber of the at least one clutch by calculating the area under the supply line pressure curve and to determine the rate of change in the volume of fluid entering the chamber by plotting the volume of fluid entering the chamber of the at least one clutch as a function of time.

20. The transmission of claim 19, wherein the control is configured to assign a moving window to the plot of the volume of fluid entering the chamber of the at least one clutch as a function of time and to determine a maximum value and a minimum value within the moving window.

21. The transmission of claim 20, wherein the control is configured to determine that the chamber of the at least one clutch is filled when the difference between the maximum value and the minimum value is less than a volume differential threshold.

* * * * *